INVENTOR.
LLOYD V. BLACK

United States Patent Office 2,840,953
Patented July 1, 1958

2,840,953

GUIDE FOR GLASS BENDING MOLDS

Lloyd V. Black, Tarentum, Pa., assignor to Pittsburgh Plate Glass Company, Allegheny County, Pa., a corporation Application December 14, 1951, Serial No. 261,657

5 Claims. (Cl. 49—67)

The present invention pertains generally to glass bending, and more specifically to apparatus for positioning of glass sheets upon bending molds of the hinged type.

In the art of glass bending as pertains to curved windshields and back lights for automobiles, large flat glass sheets are supported at opposite edges upon extended hinged molds which latter collapse into the desired contour as the glass softens and drops upon the mold when heated within appropriate furnaces.

In order to control the positioning of the glass during the initial loading thereof upon the mold and for retaining the glass in position during the initial softening of the glass as it moves within the heating furnace upon the molds, it has been necessary to provide adjustable guides upon the molds for engagement with the glass. As the glass softens during heating, the combined bending of the glass and collapse of the mold causes the glass to move downwardly away from the guides.

In the above described operation of prior art molds the workmen must exercise care when adjusting the glass into engagement with the guides so as to properly support and position the glass. These guides must be rigid in order to give positive alignment and the glass was often chipped by bumping against the guides. When the glass was engaged by the guides, the frictional resistance to free movement of the glass relative to the guide frequently distorted the edge of the softening glass. It was customary for the workmen to leave a slight clearance between the glass and the guides and human error or carelessness resulted in great variations in the amount of clearance allowed so that the resultant bent glass sheets were not uniform.

One object of the invention is to provide a guide of the character described which is of sufficient resiliency to prevent chipping of the glass when contacted therewith and yet provide positive alignment of the glass.

Another object of the invention is to provide a guide of the character described which avoids the necessity for providing clearance between the glass and guide by automatically moving away from the glass as it softens under the furnace heat.

Figure 1:
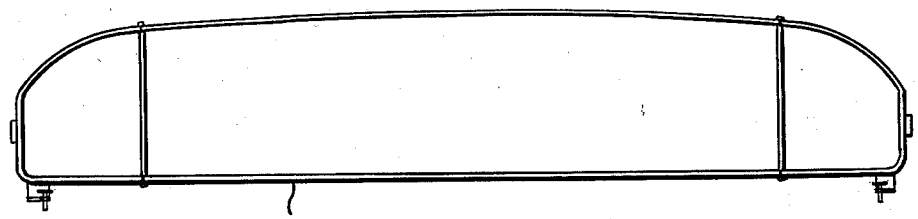
Figure 2:
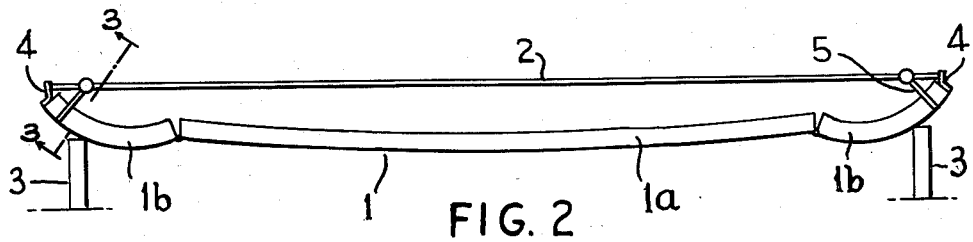
Figure 4:
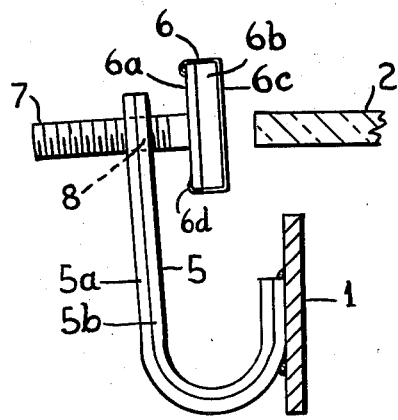
Figure 3:
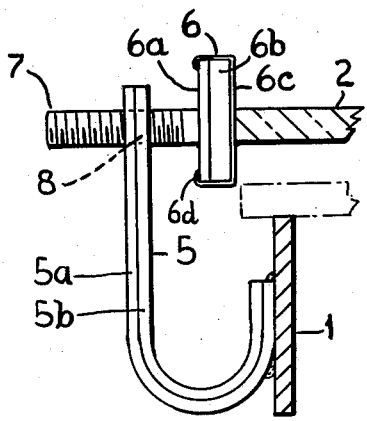

In the drawings forming part of this specification Fig. 1 shows a plan view of the mold and the glass sheet in position thereon; Fig. 2 shows in side elevation the glass sheet and mold of Fig. 1 in which the glass sheet is engaged by the guide members while holding the mold in extended or open position; Fig. 3 is an enlarged section taken on lines 3—3 of Fig. 2 showing the relative positions of the mold, the guide and the glass sheet when the mold is cold; Fig. 4 is a view similar to Fig. 3, showing the relative positions of the glass sheet and guide after the members are heated sufficiently to cause the guide to move relative to the glass.

The hinged mold indicated generally by reference character 1 may be of any well known design and may comprise two or more suitably shaped members hinged together. The mold of Figs. 1 and 2 comprises a center section 1ª and end sections 1ᵇ hingedly connected with the center section. The mold when extended, as in Fig. 2, is retained in position by means of the glass sheet 2 and is usually suspended upon any suitable supporting frame, portions of which are indicated by the reference characters 3 at opposite ends of the mold.

The glass sheet 2 of Figs. 1 and 2, is a flat sheet of suitable dimensions to form the desired final contour. It is usually slightly larger than the mold so that, as the glass softens and assumes the contour of the closed mold, the glass is supported upon and slightly overlaps the mold frame members as indicated in dot and dash lines on Fig. 3. When practicing the present invention the amount of overlap is a matter of mold design and in no way affects the operation of the guide of the invention. The glass sheet 2 is initially engaged between stops 4 of the mold sections 1ᵇ to hold the mold in open position upon the suitable supporting frame 3.

Referring now to Figs. 3 and 4 of the drawings, the guide of the invention comprises a bi-metallic body member 5 in which the metal 5ª has a different coefficient of expansion than the metal 5ᵇ and an adjustable glass engaging portion formed of the head 6 and threaded stem 7. The stem 7 is mounted within a threaded aperture 8 of member 5 as shown. The head 6 is preferably resilient and one form of construction would be a rigid portion 6ª mounted on stem 7, a resilient portion 6ᵇ which is heat resistant such as an asbestos pad and a wear resistant face portion such as metal cap 6ᶜ. The cap 6ᶜ being provided with rearwardly extending tongue portions 6ᵈ which may be bent about the portion 6ª to retain the cap in position.

The precise construction of member 6 is subject to many design modifications which will immediately suggest themselves to the user. Extreme simplification would be to mount the resilient or rigid member directly upon the member 5. This would require some changes for every different size of glass sheet, hence the use of threaded stem 7 to attach the head 6 to the member 5. Likewise omission of the head portion 6ª is practical but the use thereof makes for permanence and facilitates accurate adjustment of threaded stem 7. The cap member 6ᶜ may be omitted but use thereof retards wear of the resilient portion 6ᵇ.

In practice two or more guides are mounted on the mold, at one side thereof, as illustrated in Fig. 1 of the drawings. The glass sheet 2 is placed between the stops 4 and moved against the heads 6 of the guides for accurate positioning of the glass sheet upon the mold and for initially holding the mold in open position. Should the glass sheet 2 require adjustment relative to the mold to accurately position the bending glass upon the collapsing mold the head portions 6 of the guides may be suitably manipulated to rotate threaded stem 7 for retracting or advancing the head 6 relative to a vertical plane through the mold face to which the guide is attached. The guide portion 5 is attached to the mold by any suitable means such as welding as indicated in Fig. 3.

In operation, the assembled glass sheet 2, extended hinged mold 1 and mold frame 3 are passed into and through a suitable heating furnace (not shown) wherein the entire assembly is heated to a temperature sufficient to effect softening of the glass and bending thereof upon the mold. As the assembly is moved into the heating furnace upon any well known means (not shown), such as a conveyor of suitable form, the head members 6 in engagement with the glass accurately positions the glass relatively to the mold. As the glass approaches softening temperature under action of heat within the furnace, the bi-metallic portion 5 of the guide bends under the unequal expansion of the metals 5ª and 5ᵇ causing head 6 to move away from the glass as illustrated in Fig. 4. It is obvious to one skilled in the art that, in the particular embodiment disclosed, metal $5^b$ must have a higher coefficient of expansion than metal $5^a$ in order to provide the desired movement of head 6 away from the glass upon increasing the temperature. The glass 2 when further softened begins to sag towards the mold and the consequent closing of the mold to final contour provides the desired contour to the glass as it settles into contact with the mold.

After the mold passes out of the furnace and the glass is removed therefrom for further processing, the mold is moved towards the entrance to the furnace for reloading. As the mold and guide members cool to lower temperatures the portions 5 return to normal position and the mold is ready for reloading. Whenever the molds are used for bending glass to be subsequently tempered by sudden chilling by an air blast, in any well known manner, the guides may return to normal position before the glass is removed from the mold. When this occurs, the heads 6 of the guides being disposed above the mold, as shown in Figs. 2 and 3, offer no obstacle to free removal of the glass from the mold or injury to the glass when returning to normal position.

The foregoing description and drawings are for purposes of illustration and not limitation. Many variations in form and construction will suggest themselves and I do not intend to limit myself to the specific disclosure except as made necessary by the scope of the appended claims.

I claim:

1. In apparatus for bending glass sheets, the combination with a mold upon which sheets are adapted to be bent when exposed to bending temperatures, of a glass contacting member, and a support for said member including a heat responsive member comprising elements of different coefficients of expansion which are operable at said bending temperatures to cause movement of said contacting member away from said glass sheet.

2. The apparatus as in claim 1 in which the glass contacting member is adjustably mounted on the support for movement relaitve to the support and the glass.

3. The apparatus as in claim 1 in which the glass contacting member has a resilient glass engaging face portion to prevent chipping of the glass.

4. The apparatus as in claim 1 in which the resilient face portion has a wear resistant cover for direct contact with the glass.

5. In combination with a glass bending mold having a shaping surface conforming to the curvature to which a sheet is to be bent on the mold, a heat responsive member mounted adjacent said shaping surface for movement in angular relation thereto and including elements having different coefficients of expansion, a glass contacting element carried by the heat responsive member and in position to contact a sheet when in bending position on the mold, said heat responsive member being operable at glass softening temperature to move said contacting element out of engagement with the glass during the bending operation.

References Cited in the file of this patent

UNITED STATES PATENTS

| | | |
|---|---|---|
| 2,473,860 | Cartun | June 21, 1949 |
| 2,551,606 | Jendrisak | May 8, 1951 |